Aug. 17, 1937.                I. COWLES                2,090,250
REPLACEABLE HOSE COUPLING
Filed June 10, 1936
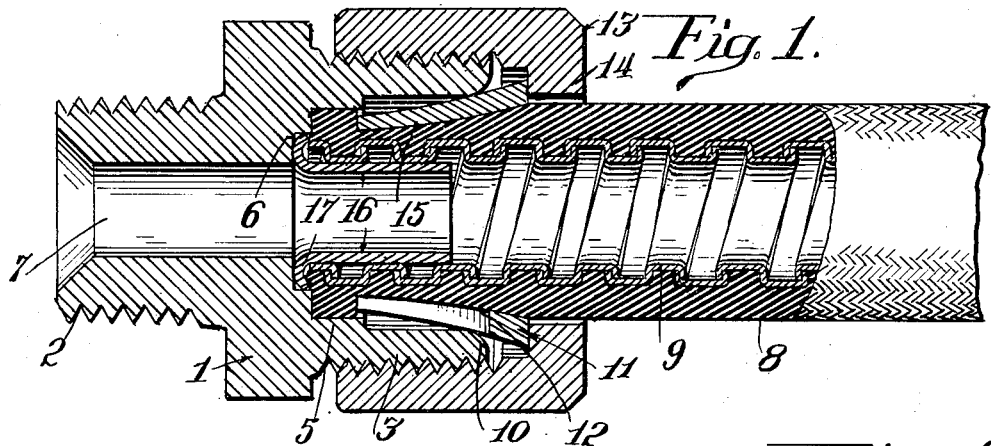
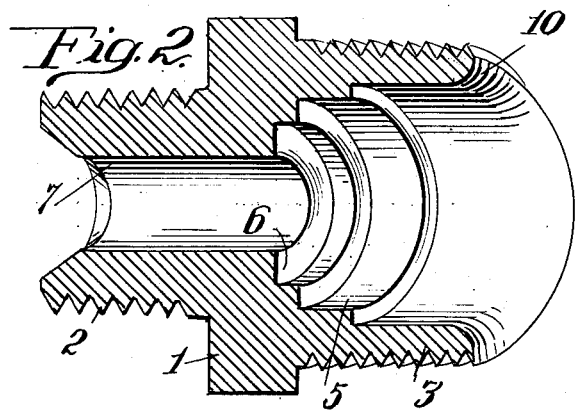
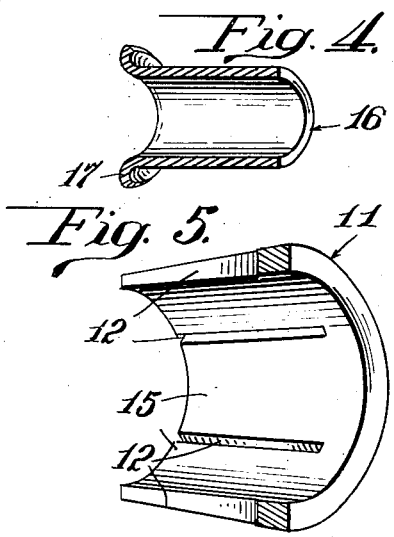
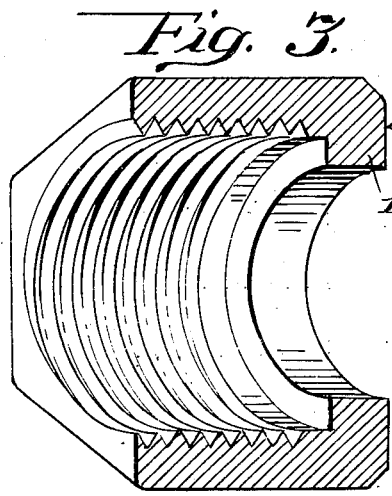
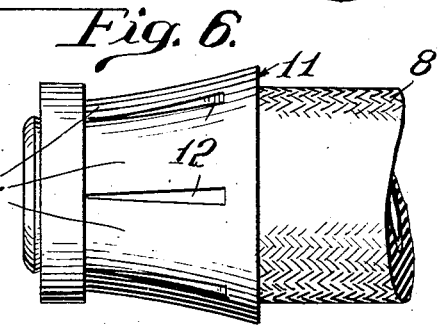
Inventor.
Irving Cowles
By Rudolph Wm Lotz
Attorney Patented Aug. 17, 1937

2,090,250

UNITED STATES PATENT OFFICE 2,090,250

REPLACEABLE HOSE COUPLING

Irving Cowles, Detroit, Mich., assignor to himself and R. W. Lotz, Chicago, Ill., as co-trustees Application June 10, 1936, Serial No. 84,395

1 Claim. (Cl. 285—86)

The main object of the present invention is to provide a removable and replaceable coupling for flexible tubing, such as rubber hose of either the ordinary type, namely, that which is not reinforced with metal, or hose which is reinforced or lined or jacketed with metal, which will so engage the hose as to force the same longitudinally to cause an extremity thereof to abut against a wall of the coupling to produce a fluid-tight joint and which, furthermore, will so engage the hose as to compress it radially and prevent it from being withdrawn from the coupling by tension stresses applied to the hose.

A further object of the invention is to provide a coupling of the type set forth which is relatively cheap to manufacture and which can be attached to or detached from hose by unskilled persons.

In the accompanying drawing illustrating a suitable embodiment of the invention, Fig. 1 is a central longitudinal sectional view of a flexible conduit consisting of a coupling constructed in accordance with the present invention and an end portion of a hose engaged therewith.

Fig. 2 is a fragmentary central longitudinal sectional perspective view showing the main member of the coupling.

Fig. 3 is a view similar to Fig. 2 showing a companion member of the coupling constructed for threaded engagement with the member shown in Fig. 2.

Fig. 4 is a perspective longitudinal sectional view showing a grommet or reinforcing sleeve capable of being used with the coupling members shown in Fig. 1.

Fig. 5 is a sectional view similar to Fig. 4 showing a contractible hose engaging member of the coupling.

Fig. 6 is a side elevation showing an end portion of the hose with the member of Fig. 5 contracted upon the same as in Fig. 1.

The coupling comprises a main member (1) which may be termed the male member of the coupling. This is equipped at one end with a nipple (2) and at its other end with an externally threaded sleeve (3). The nipple (2) is illustrated, in the instant case, as being externally threaded, but may be otherwise formed, as will be obvious. The body portion of the member (1) is preferably hexagonal externally for application of a wrench, or for its engagement in a vise. The sleeve (3) is substantially cylindrical internally and terminates at the annular shoulder (6) which borders the central bore (7) of said coupling member (1).

The diameter of the recess (5) is substantially equal to the outer diameter of the rubber hose (8) which, in the instance illustrated, is of the type equipped with a flexible metal lining (9).

The sleeve or shell (3) is equipped with a flared and preferably rounded mouth (10). The inner diameter of said sleeve is substantially equal to the smallest outer diameter of the externally tapered sleeve (11) of Fig. 5 which is provided at regular intervals with longitudinal recesses or slots (12) extending from its smallest diameter end portion to points contiguous to its largest diameter end. Said sleeve (11) is preferably cylindrical or substantially cylindrical internally and is adapted to fit upon and to be slipped upon the end of the hose (8) before the latter is inserted into the sleeve (3) of the coupling member (1).

Said sleeve (11) is disposed with its smallest end portion opposed to and spaced from the extremity of the hose (8) which is adapted to abut the said annular shoulder (6) when the hose is in its final position as shown in Fig. 1.

The outer diameter of the larger end portion of the sleeve (11) is substantially equal to the outer diameter of the flange or sleeve (3). The outer diameter of the other end of the sleeve (11) is slightly larger than the inner and smaller than the outer diameter of the flared mouth of the shell (3).

The nut (13) is preferably hexagonal externally and is threaded internally to engage the threads of the sleeve (3). It is equipped at its outer end with an annular flange (14) of appreciably smaller diameter than the greatest diameter of the sleeve (11) and of slightly larger inner diameter than the internal diameter of the said sleeve (11).

In assembling the structure, the nut (13) is placed upon the hose (8) before the sleeve (11) is placed upon the same. Thereafter, the first operation is to push the hose end home in the shell (3) and then to bring the smaller diameter end portion of the sleeve (11) into contact with the mouth portion (10) of the sleeve (3). The nut (13) is then brought into engagement with the threads of the sleeve (3) and is rotated to cause the same to ride upon the sleeve, thereby forcing the said sleeve (11) gradually to the position shown in Figs. 1 and 6.

During the movement of the sleeve (11) toward the position of Fig. 1, the fingers (15) thereof, alternating with the slots (12), will be contracted gradually and will thus bite into the jacket of the hose (8) at the same time as they will be contracted to compress or contract said hose radially. Owing to the resistance of the hose (8) to such contraction, the fingers (15) of the sleeve (11) will be flexed or bent to the slightly arcuate form shown in Figs. 1 and 6 and after said engagement thereof in the material of the hose wall (8), said fingers (15) will cause the hose end to be forced to the position shown in Fig. 1 with the extremity of the hose (8) tightly compressed against the annular shoulder (6).

Where armored or metal-lined hose of the type shown in Fig. 1 is employed, the metal lining sufficiently resists contraction to obviate employment of a central stem inside the bore of said hose and against which the hose wall is compressed. But, if the hose employed is of the ordinary non-reinforced type, the employment of a stem is necessary and requisite.

In the instance illustrated, the stem (16) consists of a sleeve or grommet equipped with an annular flange (17) which projects into engagement with the hose extremity outwardly of the metal lining (9) at said extremity. For this reason, the annular shoulder (6) is stepped to provide a central portion in which the flange (17) of the sleeve or grommet (16) is received and against the end wall of which said flange (17) is tightly compressed to form a substantially fluid-tight joint.

Obviously, in place of the particular type of sleeve (16) shown herein, the ordinary and customary central stem for engaging in the bore of the rubber hose, common to practically all hose couplings, may be employed.

To detach the coupling from the hose, the rotation of the nut (13) is reversed and under the reaction of the hose (8) the fingers (15) of the sleeve (11) will be expanded to an appreciable degree. Generally, the detachment, of course, occurs only after the hose (8) has burst, or has been worn to the point where renewal is desirable. The ordinary practice in the art is to discard the worn out hose, sometimes leaving the sleeve (11) thereon and then employing a new sleeve (11) to be attached to the coupling. However, by using a relatively sharp edged tool, such as a screwdriver, the fingers (15) may be expanded so as to permit said sleeve to be disengaged from the hose before discarding the latter and may then be mounted upon a new piece of hose and reassembled with the remaining coupling members.

Attention is directed to Patent No. 2,040,834 issued to me on May 19, 1936.

I claim as my invention:

A hose coupling comprising a body member having a central bore and equipped with an externally threaded and internally cylindrical shell disposed concentric with said bore, said shell equipped with a flaring rounded mouth, an externally tapered and internally cylindrical sleeve equipped with spaced apart longitudinal slots extending through the smaller diameter end portion of said sleeve and to points adjacent to and substantially equidistant from the other end of said sleeve, the larger diameter end portion of the latter constituting a substantially rigid annulus and said slots defining resilient fingers equipped with blunt ends, the outer diameter of the smaller end of said sleeve being slightly greater than the inner diameter of the shell, said body member equipped with an annular shoulder between the bore and said shell opposed to the mouth of the latter, an internally threaded nut equipped at its outer end with an inwardly projecting annular flange mounted on said shell and engaged with the outer end of the annulus of said sleeve, the latter when disposed upon a hose end projecting into said shell, being adapted to be moved progressively into the latter by rotation of said nut whereby to cause said fingers to be contracted progressively and cause the thinner end portions thereof to become embedded in the hose and spaced from the shell, the blunt ends of said fingers causing the same to move the hose into the shell and cause hose-wall material to be compressed between the blunt ends of said fingers and said shoulder of the coupling body at the same time that said fingers effect radial compression of the hose progressively until said nut attains substantially the inner limit of its movement relatively to the shell.

IRVING COWLES.